US012559606B2

(12) United States Patent
Chou et al.

(10) Patent No.: US 12,559,606 B2
(45) Date of Patent: Feb. 24, 2026

(54) ELASTOMER ADDITIVE PROMOTING AEROBIC BIODEGRADATION

(71) Applicants: Belle L. Chou, Danville, CA (US); Samantha Shun-Han Chang, Danville, CA (US); Ranthi Manahari Dias, Homagama (LK); Sisitha Sudarshana, Homagama (LK)

(72) Inventors: Belle L. Chou, Danville, CA (US); Samantha Shun-Han Chang, Danville, CA (US); Ranthi Manahari Dias, Homagama (LK); Sisitha Sudarshana, Homagama (LK)

(73) Assignee: SW Technologies Inc., Union City, CA (US)

( * ) Notice: Subject to any disclaimer, the term of this patent is extended or adjusted under 35 U.S.C. 154(b) by 638 days.

(21) Appl. No.: 17/993,704

(22) Filed: Nov. 23, 2022

(65) Prior Publication Data

US 2024/0166838 A1 May 23, 2024

(51) Int. Cl.
*C08J 11/24* (2006.01)
*C08K 3/34* (2006.01)
(52) U.S. Cl.
CPC .............. *C08J 11/24* (2013.01); *C08K 3/346* (2013.01); *C08J 2309/02* (2013.01)
(58) Field of Classification Search
USPC ....................................................... 521/43.5
See application file for complete search history.

(56) References Cited

FOREIGN PATENT DOCUMENTS

| AU | 2021106722 A4 | 12/2021 | |
| CN | 109265943 A | 1/2019 | |
| EP | 3875523 A1 * | 9/2021 | .............. C08J 11/24 |
| KR | 20100125399 | 11/2010 | |
| KR | 20100125399 A * | 11/2010 | .............. C08L 67/02 |
| WO | 2019074354 A1 | 4/2019 | |

OTHER PUBLICATIONS

KR-20100125399-A Machine Translation (Year: 2010).*
Belén Puyuelo, Sergio Ponsá, Teresa Gea, Antoni Sánchez, Determining C/N ratios for typical organic wastes using biodegradable fractions, Chemosphere, vol. 85, Issue 4, Oct. 2011, pp. 653-659 (Year: 2011).*

* cited by examiner

*Primary Examiner* — Terressa Boykin
(74) *Attorney, Agent, or Firm* — QuickPatents; Kevin Prince

(57) ABSTRACT

A composition for accelerating aerobic biodegradation of an elastomer, such as NBR latex, comprises an additive that includes a monomer with a plurality of polyhydroxy groups, and a growth enhancer for aerobic bacteria. When combining the monomer and the growth enhancer in a weight ratio of between 12:1 and 6:1, the result is an assimilative carbon to nitrogen ratio in the elastomer of between 10:1 and 30:1. Preferably the monomer with the plurality of polyhydroxy groups has a molecular weight of between 140-180 g/mol, and the growth enhancer of aerobic bacteria has a molecular weight of between 130-140 g/mol. In some embodiments the composition is added to a base that results in an alkaline mixture, and a dehydrating agent to inhibit agglomeration and decomposition.

14 Claims, 1 Drawing Sheet

ELASTOMER ADDITIVE PROMOTING AEROBIC BIODEGRADATION

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to degradation of elastomers, and more particularly to an additive to elastomers to enhance aerobic biodegradation.

BACKGROUND

Disposable gloves and other disposable items made from elastomers such as latex often end up in landfills, retaining substantially their original form for many years or even decades. Such elastomers are not naturally biodegradable, nor do they provide any nutrients for soil microbes, nor are they environmentally advantageous.

Chinese patent 109265943, issued on Jan. 25, 2019, describes composition that relates to biodegradable/compostable plastics, however not to elastomeric articles that are compostable. The bio-base polymers in such a prior art patent are not applicable to elastomeric articles. Such a solution further has not focused on the available C/N ratio of the composition, which is an important factor for microorganisms in a composting environment.

Korean patent application 20100125399, published on Oct. 11, 2010, is purported to provide a biodegradable polymer based composition characterized by mechanical properties suitable for use in the fields of footwear, sporting goods, and technical articles, which are molded, over molded and extruded. An object of this prior art solution is to provide a polymer-based composition conforming to the UNI standards (UNI EN 13432, UNI EN 14045, UNI EN 14046) on biodegradability and composting. These objectives are allegedly achieved by a composition comprising a hardness of 50 to 65 on the Shore A scale and 65 to the Shore D scale and comprising the following (a) to (c):

(a) 15 to 50% by weight thermoplastic polyester urethane having a hardness of 50 to 90 on Shore A scale and consisting of polyester, isocyanate, and chain extender, wherein the polyester and chain extender. The ratio between the amount and the amount of the isocyanate is less than 4:1, and the polyester is diol selected from the group consisting of butane diol, propane diol, ethylene glycol and mixtures thereof, adipic acid, succinic acid, glutaric acid and these copolymers of aliphatic organic acids selected from the group consisting of mixtures of said chain extenders selected from the group consisting of butane diol, propane diol, ethylene glycol and mixtures thereof; (b) 35 to 75% by weight copolyester having a hardness of 32 to 70 on Shore D scale, wherein the copolyester is diol selected from the group consisting of butane diol, propane diol, ethylene glycol and mixtures thereof. An aliphatic organic acid selected from the group consisting of adipic acid, succinic acid, glutaric acid and mixtures thereof, and a copolymer of terephthalic acid; and (c) 5-40% by weight of non-phthalic plasticizer. Such a product, however, disregards the available C/N ratio of the bio base composition, which is an important factor for microorganisms in a composting environment.

PCT Application WO2019074354, published on Apr. 18, 2019, teaches an invention that does not describe any potential composition or process of making a biodegradable product, or that facilitates a glove being compostable or biodegradable. In this invention organic fillers, presumably added to the composition to enhance biodegradation, is not proven by experimental results and does not provide any explanation related to organic fillers used. Furthermore, this invention calls for various rubber accelerators namely, DPTT, DPTU, ZDBC, which can be toxic to the environment and even to human skin.

Australian application 2021106722, published on Dec. 16, 2021, provides a description for a disposable, eco-friendly, easily biodegradable glove which is made of an elastomer, that is biodegradable in landfills and in composting facilities. Even though this invention claims a biodegradable composition suitable for disposable gloves, it has not further explained the adequacy of the C/N ratio needed by soil microbes and no proven experimental results are given in related to biodegradability within one year or less. It should be noted that, eco-friendly product should not harm the environment and should attempt to cut down the greenhouse gases even if the product is biodegradable. In other words, if the scope of this invention is eco-friendly the inventor should not focus on landfill biodegradation, where methane gases are emitted during biodegradation in landfills. Methane is more than 25 times as potent as carbon dioxide at trapping heat in the atmosphere.

Therefore, there is a need for a composition that can be added to such elastomers in their liquid state that would enhance aerobic biodegradation. Such a needed composition would further provide assimilative carbon/nitrogen supplies for soil microbes, preferably in a ratio of between 20:1 to 30:1. The present invention accomplishes these objectives.

SUMMARY OF THE INVENTION

The present invention is a composition for accelerating aerobic biodegradation of an elastomer, such as NBR latex, or the like, used for manufacturing disposable gloves, for example. The composition comprises an additive that includes a monomer with a plurality of polyhydroxy groups, and a growth enhancer for aerobic bacteria.

When combining the monomer and the growth enhancer in a weight ratio of between 12:1 and 6:1, and then mixing with the elastomer when the elastomer is in a liquid state, the result is a carbon to nitrogen ratio in the elastomer of between 10:1 and 30:1.

Preferably the monomer with the plurality of polyhydroxy groups has a molecular weight of between 140-180 g/mol, and the growth enhancer of aerobic bacteria has a molecular weight of between 130-140 g/mol.

Preferably the composition further includes a dehydrating agent, wherein a combination of the monomer, the growth enhancer, and the dehydrating agent results in a mixture inhibited form agglomeration or decomposition. Such a dehydrating agent may be, for example, an inert clay material, a montmorillonite material, or the like.

In use, the elastomer is mixed with the composition of the monomer, the growth enhancer, the dehydrating agent, and optionally a base such as potassium hydroxide, sodium hydroxide, or the like, such that a resulting elastomer mix includes the carbon to nitrogen ratio of between 20:1 and 30:1. Such an elastomer mix may be used to make, for example, disposable gloves, condoms, finger cots, or the like. Such products, once disposed of, will begin aerobic degradation to reduce landfill loads and the like.

The present invention is a composition that can be added to elastomers and that enhances aerobic biodegradation once it is discarded and introduced into proper environment conditions, such as industrial composting facilities. The additive reduces a volume of such elastomers in landfills or other environments after a biodegradation timeframe. The present composition further provides assimilative carbon/nitrogen supplies for soil microbes in a ratio of between 20:1 to 30:1. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1A:
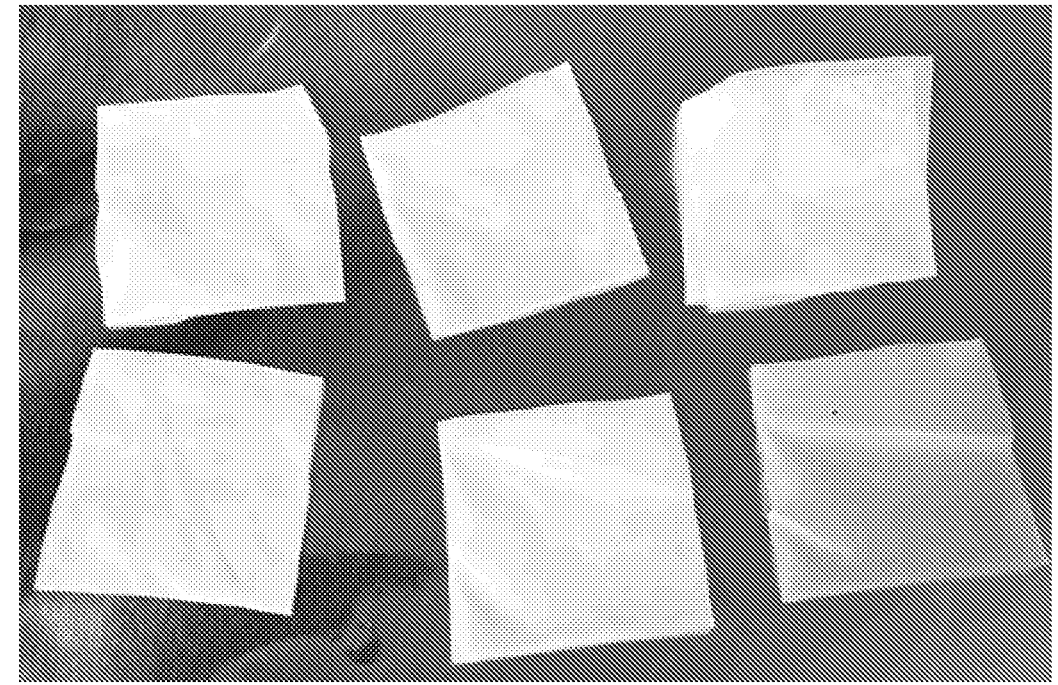
FIG. 1A shows initial test samples of an elastomer mixed with the additive of the present invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

The present invention is a composition for accelerating aerobic biodegradation of an elastomer, such as NBR latex, or the like, used for manufacturing disposable gloves, for example. The composition comprises an additive that includes a monomer with polyhydroxy groups, and a growth enhancer for aerobic bacteria.

When combining the monomer and the growth enhancer in a weight ratio of between 12:1 and 6:1, and then mixing with the elastomer when the elastomer is in a liquid state, the result is a carbon to nitrogen ratio in the elastomer of between 10:1 and 30:1. Preferably the monomer and the growth enhancer are combined in a weight ratio of between 10:1 and 8:1, resulting in a carbon to nitrogen ratio in the elastomer of between 10:1 and 25:1.

Preferably the monomer with the plurality of polyhydroxy groups has a molecular weight of between 140-180 g/mol, and the growth enhancer of aerobic bacteria has a molecular weight of between 130-140 g/mol. Ideally, the monomer with the plurality of polyhydroxy groups has a molecular weight of between 170-180 g/mol, and the growth enhancer of aerobic bacteria has a molecular weight of between 131-133 g/mol.

Preferably the composition further includes a dehydrating agent, wherein a combination of the monomer, the growth enhancer, and the dehydrating agent results in a mixture inhibited from agglomeration or decomposition. Such a dehydrating agent may be, for example, an inert clay material, a montmorillonite material, or the like.

In use, the elastomer is mixed with the composition of the monomer, the growth enhancer, the dehydrating agent, and optionally a base such as potassium hydroxide, sodium hydroxide, or the like, such that a resulting elastomer mix includes the carbon to nitrogen ratio of between 20:1 and 30:1. Such an elastomer mix may be used to make, for example, disposable gloves, condoms, finger cots, or the like. Such products, once disposed of, will begin aerobic degradation to reduce landfill loads and the like.

Figure 1B:
FIG. 1B shows the same test samples 12 weeks later after biodegradation.

Efficacy of the composition to enhance the aerobic biodegradation of elastomers was evaluated in an experiment conducted by the Applicant. Elastomer test samples made of NBR latex (FIG. 1A) were mixed with the composition. The elastomer test samples showed initial signs of degradation under aerobic biodegradation within 12 weeks (FIG. 1B). These signs were noticed as a weight reduction and $CO_2$ gas production of the test samples as presented in Tables 1 and 2, below. It is noted that weight reduction is correlated to a percentage of biodegradation that has occurred. The remaining 8% shall be production of humus and other gases such as ammonia. The elastomers will potentially transform into compost during a long-term aerobic biodegradation with exposure to industrial composting conditions.

Example 1

| TSC | Ingredient | PHR |
|---|---|---|
| 42.9 | NBR | 100.000 |
| 5.0 | KOH | 0.700 |
| 40.8 | ZnO | 1.200 |
| 10.0 | Alkaline [AT1 + AT2] additive mixture | 1.000 |
| | Total | 102.900 |

TABLE 1

| Weight loss measurements | |
|---|---|
| Average initial weight of the sample | 5.2 g |
| Average final weight of the sample after 12 weeks | 3.1 g |
| Weight loss | 2.1 g |
| Percentage weight loss | 40% |

Biodegradation Test:

Test Conditions: Test temperature (58±2) ° C.

Positive control: TLC grade cellulose

Age of compost: 3 months

Test duration: 12 weeks

TABLE 2

| No of weeks | Cumulative CO$_2$ production of test material (g/vessel) | Cumulative CO$_2$ production of positive control material (g/vessel) | Cumulative CO$_2$ production of blank (g/vessel) | The percentage biodegradation of test material (%) | The percentage biodegradation of positive control (%) |
|---|---|---|---|---|---|
| | | CO$_2$ Production Measurements | | | |
| 3 | 25.97 | 34.82 | 16.65 | 9.2 | 19.6 |
| 6 | 35.22 | 49.34 | 18.62 | 14.9 | 37.3 |
| 9 | 44.31 | 68.73 | 19.98 | 22.2 | 56.5 |
| 12 | 63.48 | 82.62 | 23.44 | 32 | 71.1 |

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A composition for accelerating aerobic biodegradation of an elastomer, comprising:

a monomer with a plurality of polyhydroxy groups; and a growth enhancer for aerobic bacteria;

wherein combining the monomer and the growth enhancer in a weight ratio of between 12:1 and 6:1 results in an assimilative carbon to nitrogen ratio in the elastomer of between 20:1 and 30:1.

2. The composition of claim 1 wherein the combining the monomer and the growth enhancer in a weight ratio of between 10:1 and 8:1 results in an assimilative carbon to nitrogen ratio in the elastomer of between 20:1 and 25:1.

3. The composition of claim 1 wherein the monomer with the plurality of polyhydroxy groups has a molecular weight of between 140-180 g/mol, and the growth enhancer of aerobic bacteria has a molecular weight of between 130-140 g/mol.

4. The composition of claim 1 wherein the monomer with the plurality of polyhydroxy groups has a molecular weight of between 170-180 g/mol, and the growth enhancer of aerobic bacteria has a molecular weight of between 131-133 g/mol.

5. The composition of claim 1 further including a dehydrating agent, wherein a combination of the monomer, the growth enhancer, and the dehydrating agent results in a mixture inhibited from agglomeration or decomposition.

6. The composition of claim 5 wherein the dehydrating agent includes an inert clay material.

7. The composition of claim 5 wherein the dehydrating agent includes montmorillonite.

8. A method of accelerating aerobic biodegradation of an elastomer, comprising the steps:

A) providing a monomer with a plurality of polyhydroxy groups;

B) providing a growth enhancer for aerobic bacteria; and

D) combining the monomer and the growth enhancer in a weight ratio of between 12:1 and 6:1; whereby the resulting mixture has a carbon to nitrogen ratio in the elastomer of between 20:1 and 30:1.

9. The method of claim 8 further including the step:

D') combining the monomer and the growth enhancer in a weight ratio of between 10:1 and 8:1, whereby the resulting mixture has a carbon to nitrogen ratio in the elastomer of between 20:1 and 25:1.

10. The method of claim 8 wherein step A) is replaced with:

A') providing a monomer with a plurality of polyhydroxy groups having a molecular weight of between 140-180 g/mol;

and wherein step B) is replaced with:

B') providing a growth enhancer for aerobic bacteria having a molecular weight of between 130-140 g/mol.

11. The method of claim 8 wherein step A) is replaced with:

A') providing a monomer with a plurality of polyhydroxy groups having a molecular weight of between 170-180 g/mol;

and wherein step B) is replaced with:

B') providing a growth enhancer for aerobic bacteria having a molecular weight of between 131-133 g/mol.

12. The method of claim 8 further including the step:

C) providing a dehydrating agent, wherein a combination of the monomer, the growth enhancer, the elastomer when in a liquid form, and the dehydrating agent results in a mixture inhibited from agglomeration or decomposition.

13. The method of claim 8 further including the step:

C) providing a dehydrating agent that includes an inert clay material, wherein a combination of the monomer, the growth enhancer, the elastomer when in a liquid form, and the dehydrating agent results in a mixture inhibited from agglomeration or decomposition.

14. The method of claim 8 further including the step:

C) providing a dehydrating agent that includes montmorillonite, wherein a combination of the monomer, the growth enhancer, the elastomer when in a liquid form, and the dehydrating agent results in a mixture inhibited from agglomeration or decomposition.

* * * * *